(12) United States Patent
Lee et al.

(10) Patent No.: US 7,330,694 B2
(45) Date of Patent: Feb. 12, 2008

(54) METHOD FOR SETTING UP ROUTE PATH THROUGH ROUTE DISCOVERY IN A MOBILE AD HOC NETWORK USING PARTIAL ROUTE DISCOVERY

(75) Inventors: Jai-Ho Lee, Seoul (KR); In-Oh Chung, Suwon-si (KR); Jai-Dong Kim, Seoul (KR); Soon-Jung Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 608 days.

(21) Appl. No.: 10/916,049

(22) Filed: Aug. 11, 2004

(65) Prior Publication Data
US 2005/0073992 A1 Apr. 7, 2005

(30) Foreign Application Priority Data
Oct. 7, 2003 (KR) .................. 10-2003-0069660

(51) Int. Cl.
*H04L 12/28* (2006.01)
*H04B 3/36* (2006.01)
*H04B 7/14* (2006.01)
*H04B 7/00* (2006.01)
*H04Q 7/20* (2006.01)

(52) U.S. Cl. .................. 455/7; 455/41.2; 455/446; 370/351; 370/401

(58) Field of Classification Search .................. 455/7, 455/11.1, 446, 41.2; 370/401, 351, 238
See application file for complete search history.

(56) References Cited

U.S. PATENT DOCUMENTS

| 6,594,468 B1* | 7/2003 | Ramanathan ............... 455/7 |
| 6,999,717 B2* | 2/2006 | Spratt et al. ............... 455/7 |
| 7,092,715 B2* | 8/2006 | Korpela et al. ............ 455/446 |
| 2004/0141511 A1* | 7/2004 | Rune et al. ............... 370/401 |
| 2005/0073992 A1* | 4/2005 | Lee et al. ................ 370/351 |
| 2005/0090201 A1* | 4/2005 | Lengies et al. ........... 455/41.2 |
| 2005/0122955 A1* | 6/2005 | Lin et al. ................ 370/351 |

* cited by examiner

*Primary Examiner*—William D. Cumming
(74) *Attorney, Agent, or Firm*—The Farrell Law Firm, PC

(57) ABSTRACT

Provided is a method for setting up a route path between source and destination nodes in a mobile ad hoc network. The source node transmits a RREQ message to the destination node, which transmits a RREP message to the source node. A first intermediate node having failed to transmit the original RREP stores the original RREP, and generates and transmits a PRREQ message, to neighbor intermediate nodes. If an ID of the PRREQ and an original IP address included in the received PRREQ are identical to those of the RREQ received from the source node, a second intermediate node receiving the PRREQ generates and transmits a PRREP message corresponding to the PRREQ to the first intermediate node. If a partial route path is set up between the first and second intermediate nodes, the first intermediate node transmits the original RREP to the source node, which completes setup of the route path.

6 Claims, 10 Drawing Sheets

| 0                                     | 1                   | 2        | 3         |
|---------------------------------------|---------------------|----------|-----------|
| 0 1 2 3 4 5 6 7 8 9 0 1 2 3 4 5 6 7 8 9 0 1 2 3 4 5 6 7 8 9 0 1 | | | |
| Type | J R G D U | Reserved | Hop Count |
| RREQ ID |
| Originator IP Address |
| Partial RREQ ID |
| Partial Originator IP Address |
| Partial Originator Sequence Number |
| Partial RREQ Lifetime |

FIG.6

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Type | | | | | | | | R | Reserved | | | | | | | | | | | | Prefix Sz | | | | Hop Count | | | | | | |
| Partial Destination IP Address | | | | | | | | | | | | | | | | | | | | | | | | | | | | | | | |
| Partial Destination Sequence Number | | | | | | | | | | | | | | | | | | | | | | | | | | | | | | | |
| Partial Originator IP Address | | | | | | | | | | | | | | | | | | | | | | | | | | | | | | | |
| Partial RREQ Lifetime | | | | | | | | | | | | | | | | | | | | | | | | | | | | | | | |

FIG. 7

METHOD FOR SETTING UP ROUTE PATH THROUGH ROUTE DISCOVERY IN A MOBILE AD HOC NETWORK USING PARTIAL ROUTE DISCOVERY

PRIORITY

This application claims priority under 35 U.S.C. § 119 to an application entitled "Method for Setting up Route Path through Route Discovery in a Mobile Ad Hoc Network Using Partial Route Discovery" filed in the Korean Intellectual Property Office on Oct. 7, 2003 and assigned Ser. No. 2003-69660, the contents of which are incorporated herein by reference.

BACKGROUND OF THE INVENTION

1. Field of the Invention

The present invention relates generally to a Mobile Ad hoc Network (MANET), and in particular, to a mobile ad hoc network capable of efficiently discovering and setting up a route from a source node to a destination node, and a route discovery method using the same.

2. Description of the Related Art

A mobile ad hoc network (MANET) refers to a network capable of transferring data between mobile nodes without a communication infra-structure. The mobile ad hoc network technology has been sporadically developed over 20 years. In the early 1970's, radio network technology called Mobile Packet Radio was developed, and since then, it has been applied to various radio physical layer systems such as a diffused infrared system. Fundamentally, the mobile ad hoc network technology makes it possible to form systems unique to mobile nodes. Therefore, the mobile ad hoc network technology is suitable for independent operation of communication networks.

The mobile ad hoc network technology has a self-forming, self-healing network structure adaptable to situations in which data is rapidly spreading and mobility of the communication network's nodes and a traffic transmission condition are subject to frequent change. The mobile ad hoc network is best characterized in that it requires a minimized fixed infra-structure. Other characteristics of the mobile ad hoc network include a relatively frequent change in distributed peer-to-peer mode, multi-hop routing and node arrangement.

The mobile ad hoc network technology can include the Defense Advanced Research Projects Agency's (DARPA's) Packet Radio Network and Survivable Adaptive Network (SURAN) programs developed in the 1970's and 1980's. Although the mobile ad hoc network technology is mainly applied to military tactical communications, it can also be applied to natural disasters, legal execution procedures, and commercial and educational sensor networks. The mobile ad hoc network is roughly comprised of application software, mobile routing, and transport, medium access control (MAC) and physical layers. Among others, the mobile routing and the MAC and physical layers are the core technology of the mobile ad hoc network.

Currently, various technologies have been proposed as the mobile ad hoc network technologies. Table 1 below shows mobile ad hoc network technologies classified according to routing protocol.

TABLE 1

| Pro-active Protocols (table-driven) | Re-active Protocols (on-demand) | Clustering Routing Protocols |
|---|---|---|
| DSDV (Destination Sequenced Distance Vector, 1994) | DSR (Dynamic Source Routing) | ZRP (Zone Routing Protocol) |
| WRP (Wireless Routing Protocol, 1996) | AODV (Ad hoc On-demand Distance Vector) | OLSR (Optimized Link State Routing) |
| GSR (Global State Routing, 1998) | TORA (Temporally Ordered Routing Algorithm) | CEDAR (Core Extraction Distributed Ad hoc Routing) |
| FSR (Fisheye State Routing, 1999) | ABR (Associativity-Based Routing) | CBRP (Cluster Based Routing Protocol) |

With the recent development of applicable commercial radio communication technology, many efforts are being made to achieve commercial standardizations, such as HiperLAN (High Performance Radio Local Area Network) by ETIS (European Telecommunication Standards Institute), the wireless LAN standard by IEEE (Institute of Electrical & Electronics Engineers), and recent developments in the Bluetooth consortium.

In addition, a public network-based wireless LAN service, known as the next generation wire/wireless integrated communication technology, will be the a core issue of the future communication markets. It is expected that the wireless LAN will cause a qualitative change in information technology (IT) industries. In particular, the public network-based wireless LAN is expected to cause quantitative growth of related industries because it aims to support mobile nodes such as a notebook computer and a personal digital assistant (PDA). Among others, an IEEE 802.11 wireless LAN is in the spotlight of the wireless LAN field, and is one of the more popularly used technologies.

In the mobile ad hoc network, connection between mobile nodes is made using peer-to-peer level multi-hopping technology. Such technology has many problems to solve because it needs to be able to dynamically change a network topology and achieve self forming and self healing. In the mobile ad hoc network, ad-hoc routing is important and is technology that must be necessarily supported before a certain application is installed in the mobile ad hoc network. In addition, route discovery of the ad-hoc routing is core technology used for forming the mobile ad hoc network.

In a current method of forming a mobile ad hoc network using AODV (Ad Hoc On-Demand Distance Vector) protocol, when a source node desires to communicate with a destination node, route discovery is performed by the source node if there is no information on the destination node. Here, the AODV protocol is a typical on-demand routing protocol in the mobile ad hoc network, and is a routing technique for generating a route when a source node sends a data transmission request to a destination node. At this point, all nodes in the mobile ad hoc network maintain information on only the route via which data is transmitted, in a routing table. A source node desiring to send data discovers, or searches for the shortest route to a destination node on an on-demand basis, through a route discovery procedure.

In the AODV protocol, there are four types of messages used for route discovery and maintenance. The four messages include Route Request (RREQ), Route Reply (RREP), Route Error (RERR), and Route Reply Acknowledgement (RREP-ACK).

The RREQ is a message used by a source node to discover (search) a destination node, i.e., to request route generation. The RREP is a response message to the RREQ. That is, if a node receiving the RREQ itself is a destination node or knows a route path to a destination node, it transmits an RREP message to a node that first transmitted the RREQ (hereinafter, referred to as an RREQ source node), in response to the RREQ message on a unicast basis.

The RREP-ACK is a message used by an RREQ source node receiving the RREP to respond to the received RREP message. The RERR is a message used to notify a source node of route disconnection when a route to a destination node is disconnected. Here, a source node receiving the RERR starts a new route discovery procedure in order to generate a new route to the destination node.

FIG. 1 is a diagram illustrating a procedure for performing route discovery in an AODV protocol. A source node 10 transmits a RREQ message to a destination node 20 in order to set up a route to the destination node 20. If the source node 10 transmits the RREQ, nodes which are not the destination node 20 or have no information on the destination node 20 forward the RREQ to their neighbor nodes. After the RREQ is forwarded to the neighbor nodes, a reverse path to the source node 10 is formed.

If a node receiving the RREQ is a destination node or an intermediate node having information on the destination node, it sends a RREP message to the source node 10, or an RREQ source node. The intermediate node sends the RREP having information on the destination node to the RREQ source node 10, using a reverse path formed with the RREQ. If the RREQ source node 10 receives the RREP, a forward path to the intermediate node is formed, completing route discovery. In this way, a route path between the source node 10 and the destination node 20 is completed through intermediate nodes 12, 14 and 16 that transmitted and received the RREQ and the RREP messages.

In the above process, if a procedure for requesting a RREP by sending a RREQ has occurred in a unidirectional link, a corresponding node may fail to transmit the RREP even though it has received the RREQ. If no RREP generated by the same route discovery can arrive at the RREQ source node 10, the RREQ source node 10 re-attempts the route discovery after a lapse of a predetermined time.

In this case, the RREQ source node 10 repeatedly performs the same route discovery operation without any modifications. Therefore, even though the RREQ source node 10 repeatedly re-attempts the route discovery, it will fail to discover and set up a route path. In this case, if any recovery operation is not performed between the source node 10 and the destination node 20, there is a high possibility that the above problem will occur even though there is another bidirectional route available between the source node 10 and the destination node 20.

In order to solve such a problem, in the existing AODV protocol, when a node fails to transmit the RREP message, the corresponding node stores a next-hop node for the failed RREP in a black list. In addition, the node disregards a RREQ message received from a node in the black list, and removes the node in the black list after a lapse of a predetermined time.

Such a unidirectional link formed between nodes causes a long time delay as well as potentially a fatal difficulty in completing the route discovery procedure. Although the method of generating a black list in order to solve this problem in the existing AODV protocol can avoid a unidirectional link, it must repeatedly perform route discovery on the same route path. Such a method using a black list deteriorates efficiency of a mobile ad hoc network because a time period actually required for forming a route is increased due to the occurrence of many route paths.

FIG. 2 is a diagram illustrating a method for solving problems occurring due to a unidirectional link in the existing AODV protocol. In the drawing, the number of arrows is identical to a transmission count (or transmission number) of RREQ messages and RREP messages used to form a route path by completing route discovery.

In order to resolve the problem occurring due to the unidirectional link, conventionally, an intermediate node 36 includes a next hop node 35 to which it intended to send the RREP message, in a black list, and disregards RREQ messages transmitted from nodes in the black list. Thereafter, the source node 30 again performs route discovery from the beginning by re-sending a route request to the desired destination node 40.

Therefore, because the node 36 having a black list does not receive a RREQ from the node 35 connected with a unidirectional link when the route discovery procedure is performed again, the AODV protocol does not strive to form a route passing through the node 35 included in a black list and the node 36 having a black list. However, the source node 30 must again perform a route request operation on the desired destination node from the beginning. That is, the conventional route discovery method improved to resolve the unidirectional link problem performs again the entire route discovery each time an error occurs, raising another problem that RREQ and RREP messages which become overhead on the entire network are frequently transmitted over the entire network and the network performance is deteriorated due to the number of unnecessary duplicate RREQ and RREP messages.

If the route discovery procedure is performed again, the source node 30 discards the previously performed route discovery procedure. In such a conventional method, RREQ and RREP messages which are regarded as overhead in terms of throughput of the network are unnecessarily transmitted several times, causing deterioration in route discovery performance. In addition, the conventional method requires a long time delay in performing route discovery, deteriorating efficiency of a mobile ad hoc network. In particular, the conventional method may have a fatal problem when there are several nodes in the mobile ad hoc network.

SUMMARY OF THE INVENTION

It is, therefore, an object of the present invention to provide a mobile ad hoc network capable of increasing efficiency of the entire network by reducing a time delay required for setting up a route path between a source node and a destination node, and a route setup method using the same.

It is another object of the present invention to provide a mobile ad hoc network capable of setting up a route path between a source node and a destination node while reducing overhead on the network occurring because of repeated transmission of RREQ and RREP messages to resolve an error occurring due to a unidirectional link, and a route setup method using the same.

To achieve the above and other objects, there is provided a method for setting up a route path between a source node and a destination node through route discovery in a mobile ad hoc network. The method comprises the steps of: transmitting by the source node a route request message (RREQ) to the destination node; receiving by the destination node the RREQ and transmitting an original route reply message (RREP) to the source node in response to the RREQ; storing, by a first intermediate node having failed to transmit the original RREP received from the destination node due to a unidirectional link between nodes among intermediate nodes between the source node and the destination node, the original RREP, generating and storing a partial route request message (PRREQ) according to a predetermined PRREQ format, and transmitting the generated PRREQ to neighbor intermediate nodes; if an identifier (ID) of PRREQ and an original (or originator) Internet protocol (IP) address included in the received PRREQ are identical to an ID and an original IP address of the RREQ received from the source node, generating, by a second intermediate node receiving the PRREQ, a partial route reply message (PRREP) corresponding to the PRREQ and transmitting the PRREP to the first intermediate node that transmitted the PRREQ; if a partial route path is set up between the first intermediate node and the second intermediate node when the first intermediate node receives the PRREP, transmitting by the first intermediate node the original RREP stored via a path established to the source node, via the partial route path; and receiving by the source node the original RREP, and completing setup of the route path.

To achieve the above and other objects, there is provided a node in a mobile ad hoc network for setting up a route path between a source node and a destination node through route discovery. The node comprises a reception (RX) block for receiving signals transmitted from neighbor nodes; a transmission (TX) block for transmitting signals to the neighbor nodes; a route request (RREQ) block for processing a route request message (RREQ) received from a previous node and a RREQ to be transmitted to a next node; a route reply (RREP) block for processing a route reply message (RREP) received from the next node and a RREP to be transmitted to the previous node; a route error (RERR) block for notifying the source node of a route disconnection when a route to the destination node is disconnected; a data block for processing actual transmission data; a link failure block for detecting failure to transmit and receive a signal; a partial route discovery block for performing partial route discovery for setting up a new route via other nodes excluding a node that received the RREQ; and a neighbor received signal strength indication (RSSI) block for calculating RSSI for a neighbor node located within a one-hop distance from the node itself and providing the calculated RSSI to the partial route discovery block.

Preferably, the partial route discovery block performs the partial route discovery if transmission/reception failure information is received from the link failure block or the RSSI provided from the neighbor RSSI block is lower than an RSSI threshold.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating a format of a partial route request message (PRREQ) according to an embodiment of the present invention;

FIG. 7 is a diagram illustrating a format of a partial route reply message (PRREP) according to an embodiment of the present invention;

DETAILED DESCRIPTION OF THE PREFERRED EMBODIMENT

Figure 1:
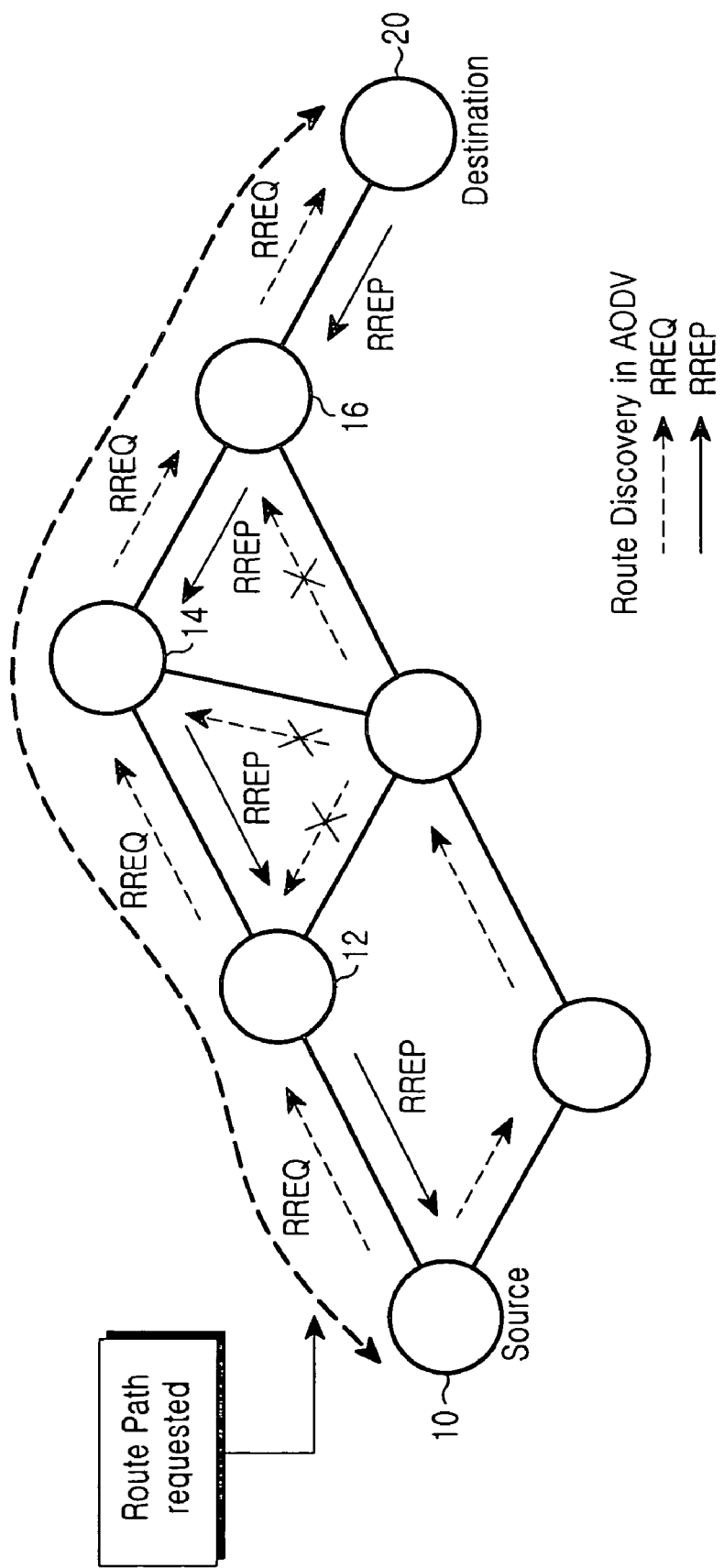
FIG. 1 is a diagram illustrating a procedure for performing route discovery in an AODV protocol.
Figure 2:
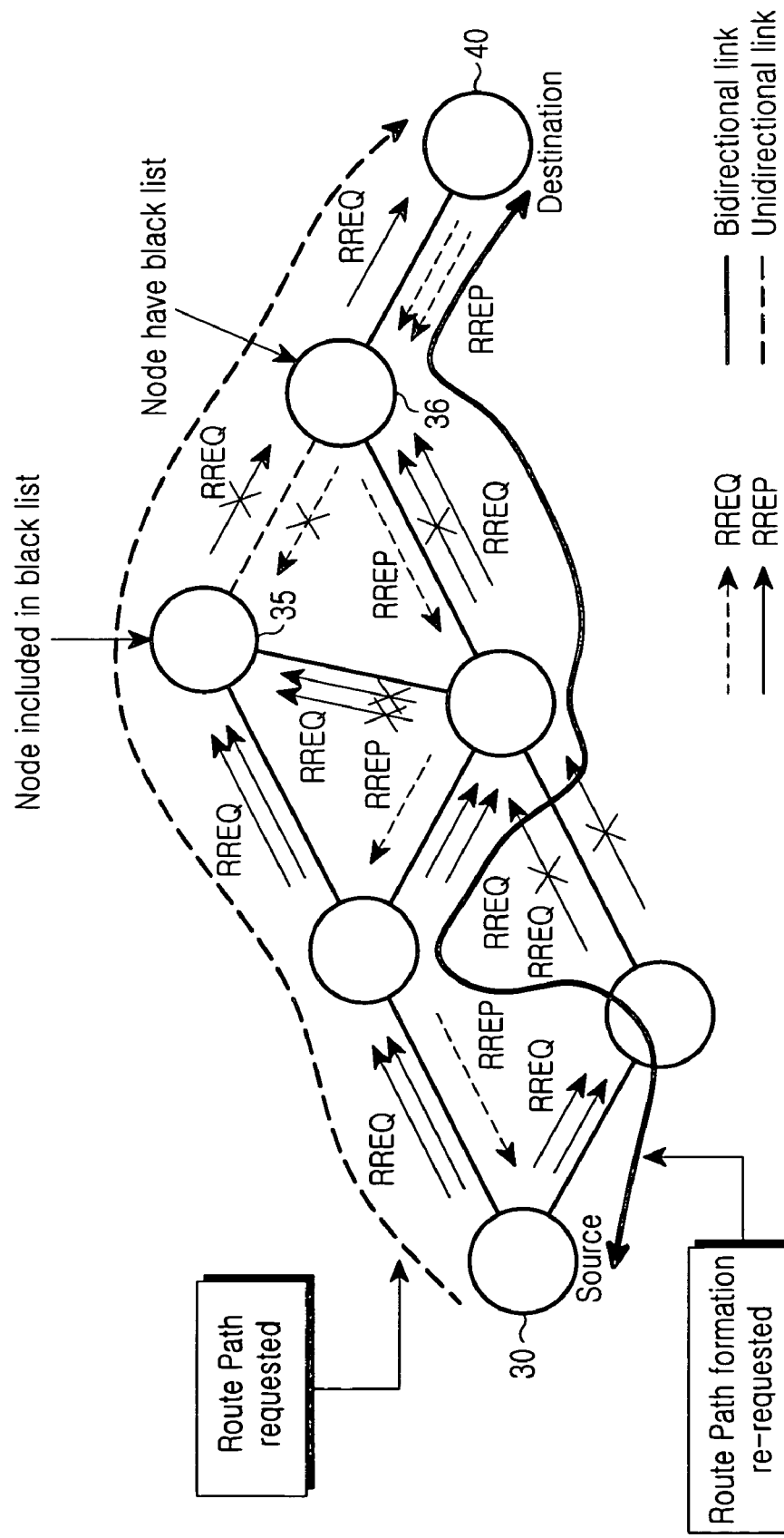
FIG. 2 is a diagram illustrating a method for solving problems occurring due to a unidirectional link in the existing AODV protocol.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 3:
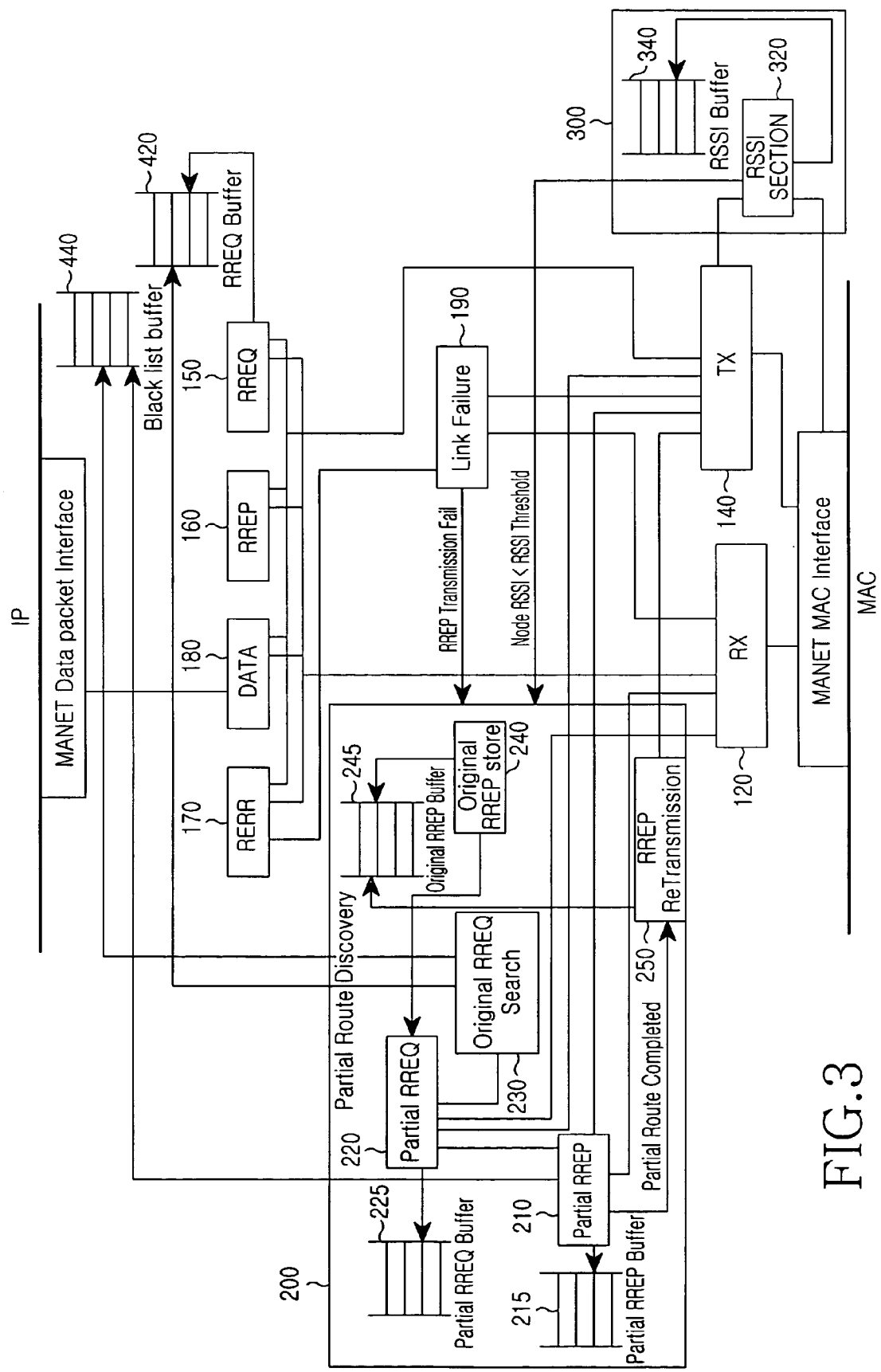
FIG. 3 is a block diagram illustrating a node capable of more efficiently performing route discovery in a mobile ad hoc network according to a preferred embodiment of the present invention.

FIG. 3 is a block diagram illustrating a node capable of more efficiently performing route discovery in a mobile ad hoc network according to a preferred embodiment of the present invention. As illustrated, a node adapted for route discovery in a mobile ad hoc network according to an embodiment of the present invention has a reception (RX) block 120, a transmission (TX) block 140, an RREQ block 150, an RREP block 160, an RERR block 170, a data block 180, a link failure block 190, a partial route discovery block 200, and a neighbor RSSI (Received Signal Strength Indication) block 300.

The RX block 120 controls reception of a signal, and the TX block 140 controls transmission of a signal. The RREQ block 150 processes RREQ messages received from a previous node and RREQ messages to be transmitted to a next node, and the RREP block 160 processes RREP messages received from a next node and RREP messages to be transmitted to a previous node.

The RERR block 170 notifies a source node of route disconnection when a route to a destination node is disconnected, and the data block 180 processes transmission data. The link failure block 190 detects failure to transmit and receive a signal and reflecting the detection result, and the partial route discovery block 200 performs partial route discovery. The neighbor RSSI block 300 processes RSSI information for a node located within one-hop distance from its own node.

The partial route discovery block 200 is comprised of a partial RREP section 210, a partial RREQ section 220, an original RREQ search section 230, an original RREP store section 240, and an RREP retransmission section 250, in order to perform partial route discovery. In addition, the neighbor RSSI block 300 includes an RSSI section 320 and an RSSI buffer 340.

As illustrated, the node according to an embodiment of the present invention includes an RREQ buffer 420 for storing RREQs and a black list buffer 440 for storing black-listed nodes.

Figure 4:
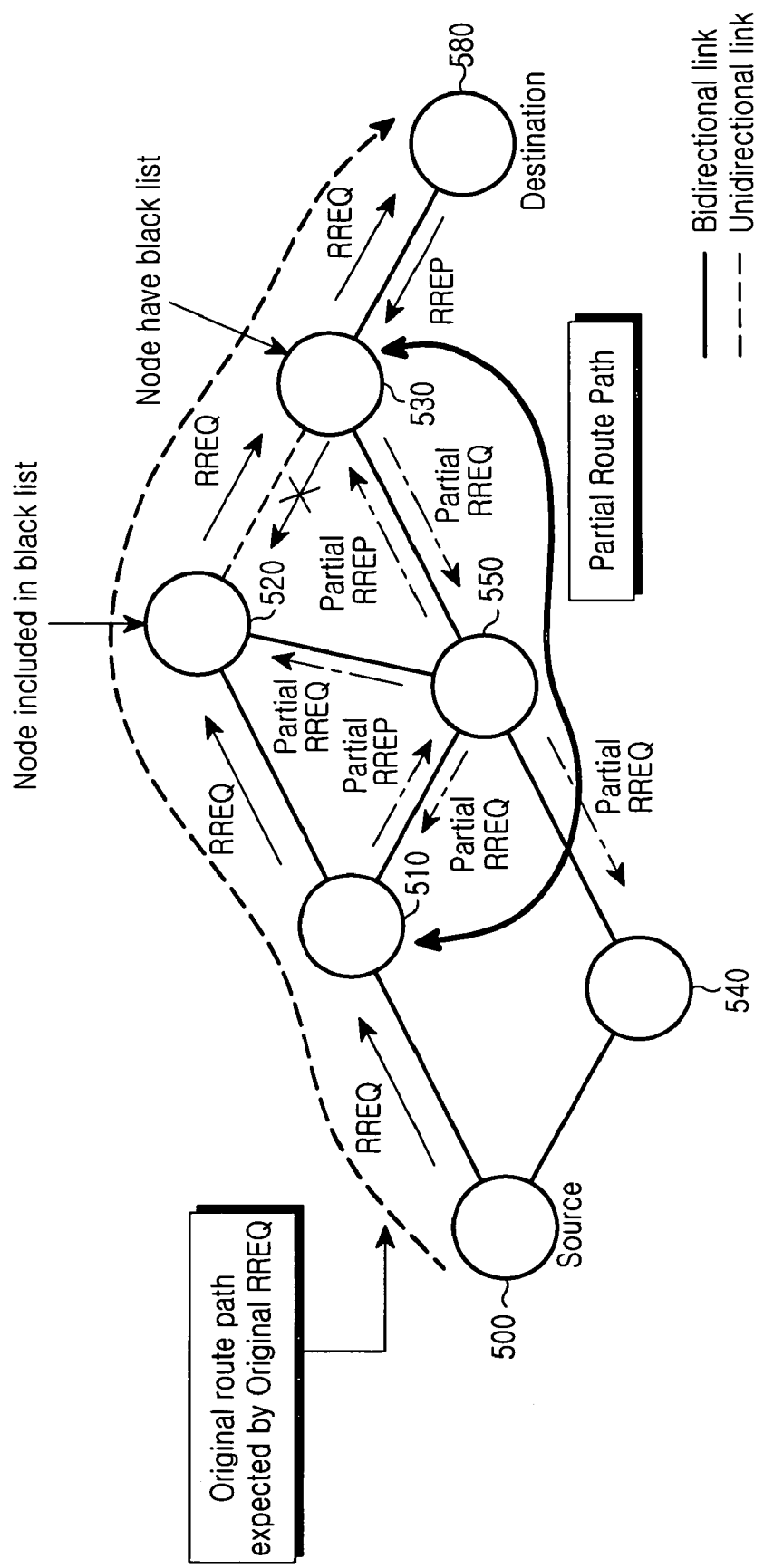
FIG. 4 is a diagram illustrating a process of removing a unidirectional link by performing partial route discovery to resolve a problem occurring due to the unidirectional link, thereby forming a partial route path.

FIG. 4 is a diagram illustrating a process of removing a unidirectional link by performing partial route discovery to resolve a problem occurring due to the unidirectional link, thereby forming a partial route path. The route discovery procedure according to an embodiment of the present invention will now be described herein below.

If a source node 500 sends a RREQ message, nodes 510, 520 and 530 which are not a destination node 580 or have no information on the destination node 580 forward the RREQ message to their neighbor nodes. After the RREQ message is forwarded to the neighbor nodes, a reverse path from the corresponding nodes to the source node 500 is formed. If a node receiving the RREQ message is the destination node 580 or an intermediate node having information on the destination node 580, the corresponding node sends a RREP message to the source node 500. The RREP message is transmitted to the source node 500 via a reverse path formed with the RREQ message. Here, the RREP message has information on the destination node 580.

If the source node 500 receives the RREP message, a forward path is formed, completing route discovery. In this way, a route path is completed between the source node 500 and the destination node 580. As a result, an original route path between the source node 500 and the destination node 580, expected by an original RREQ message, is formed through the intermediate nodes 510, 520 and 530.

In this process, if a procedure for requesting a RREP message by sending a RREQ message has occurred in a unidirectional link, a corresponding node may fail to transmits the RREP message even though it has received the RREQ message, raising a problem caused by the unidirectional link.

Figure 5:
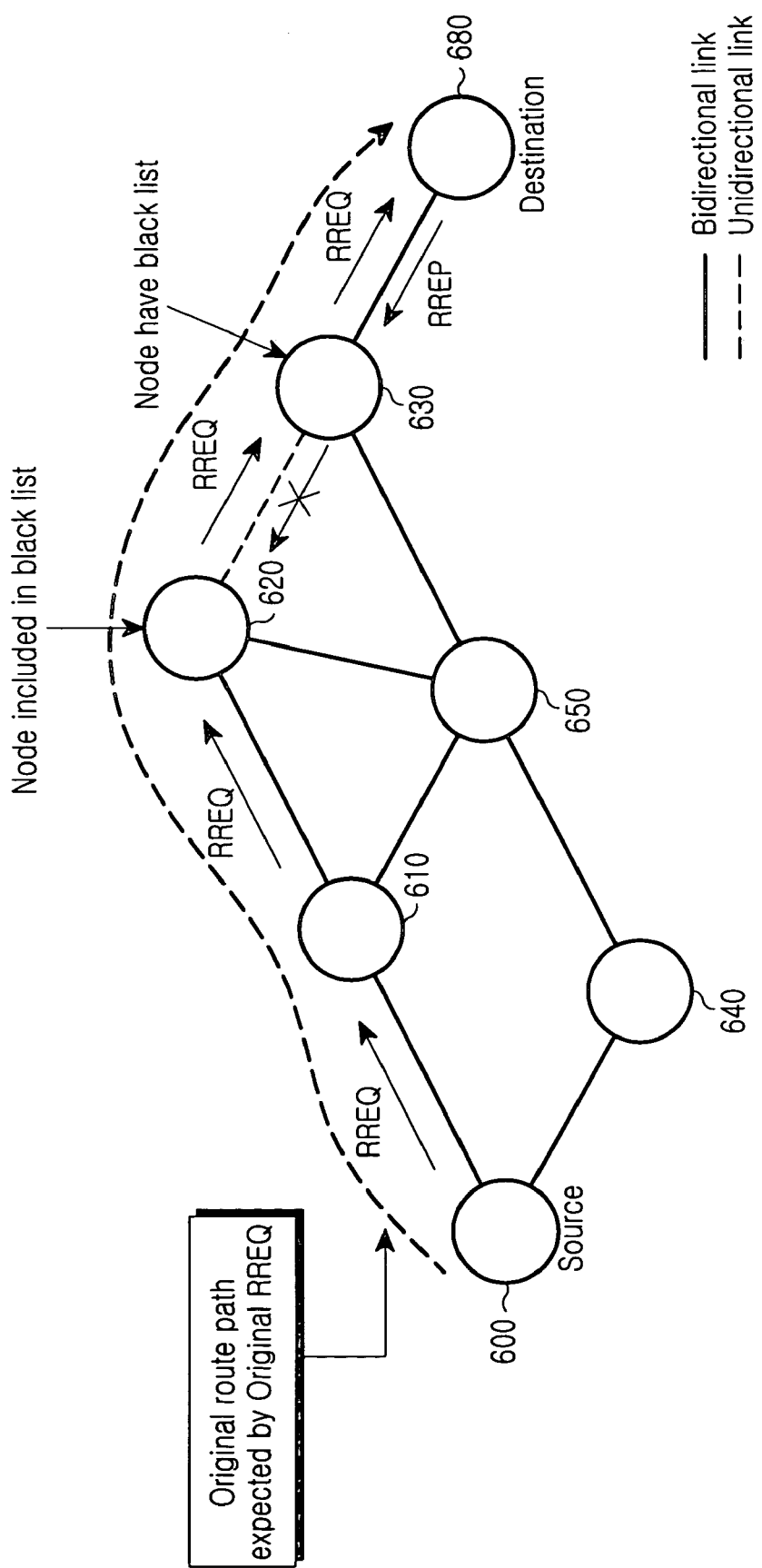
FIG. 5 is a diagram illustrating a problem occurring due to a unidirectional link.

FIG. 5 is a diagram illustrating a problem occurring due to a unidirectional link. Although it is expected that an original route path between a source node 600 and a destination node 680 will be formed through intermediate nodes 610, 620 and 630 based on original an RREQ message, the node 630 having information on the node 620 included in a black list cannot forward a RREP message to the node 620 included in the black list.

Therefore, in the embodiment of the present invention, when a node desires to send a RREP in response to the RREQ using a reverse path formed based on the RREQ message, the partial route discovery block 200 receives the RREP transmission failure information from the link failure block 190 or acquires RSSI information for a next hop node for the RREP message from the neighbor RSSI block 300 that processes RSSI for a neighbor node before transmission. If the acquired RSSI value is lower than an RSSI threshold, the partial route discovery block 200 considers that a problem caused by a unidirectional link has occurred.

If the partial route discovery block 200 detects a unidirectional link, the node 630 having failed to transmit the RREP registers the next hop node 620 for the RREP in the black list buffer 440. In this case, the node 630 having failed to transmit the RREP does not receive the RREQ forwarded from a node included in its black list buffer 440. In addition, the node 630 having failed to transmit the RREP removes node information in the black list buffer 440 after a lapse of a predetermined time.

The node 630 having failed to transmit the RREP due to the unidirectional link the stores original RREP in an original RREP buffer 245 via the original RREP store section 240. When a partial route path is completed, the node 630 having failed to transmit the RREP message due to the unidirectional link completes a route path by transmitting the RREP stored in the original RREP buffer 245 via the completed partial route path.

The node 630 having failed to transmit the RREP due to the unidirectional link generates a partial RREQ (PRREQ) for performing partial route discovery according to a PRREQ format illustrated in FIG. 6, and transmits the PRREQ to its neighbor nodes 610, 620, 640 and 650. Among the neighbor nodes 610, 620, 640 and 650, the node 610 capable of receiving the RREP transmits a partial RREP message (PRREP) to the node 630 that transmitted the PRREQ, in response to the PRREQ. A format of the PRREP is illustrated in FIG. 7.

If the node 630 having failed to transmit the RREP message due to the unidirectional link receives the PRREP, a partial route path is completed. In this case, the node 630 having failed to transmit the RREP message due to the unidirectional link transmits the original RREP received from the destination node 680 via the partial route path. As a result, a complete route path is formed between the source node 600 and the destination node 680 via the intermediate nodes 610, 650 and 630.

Figure 8:
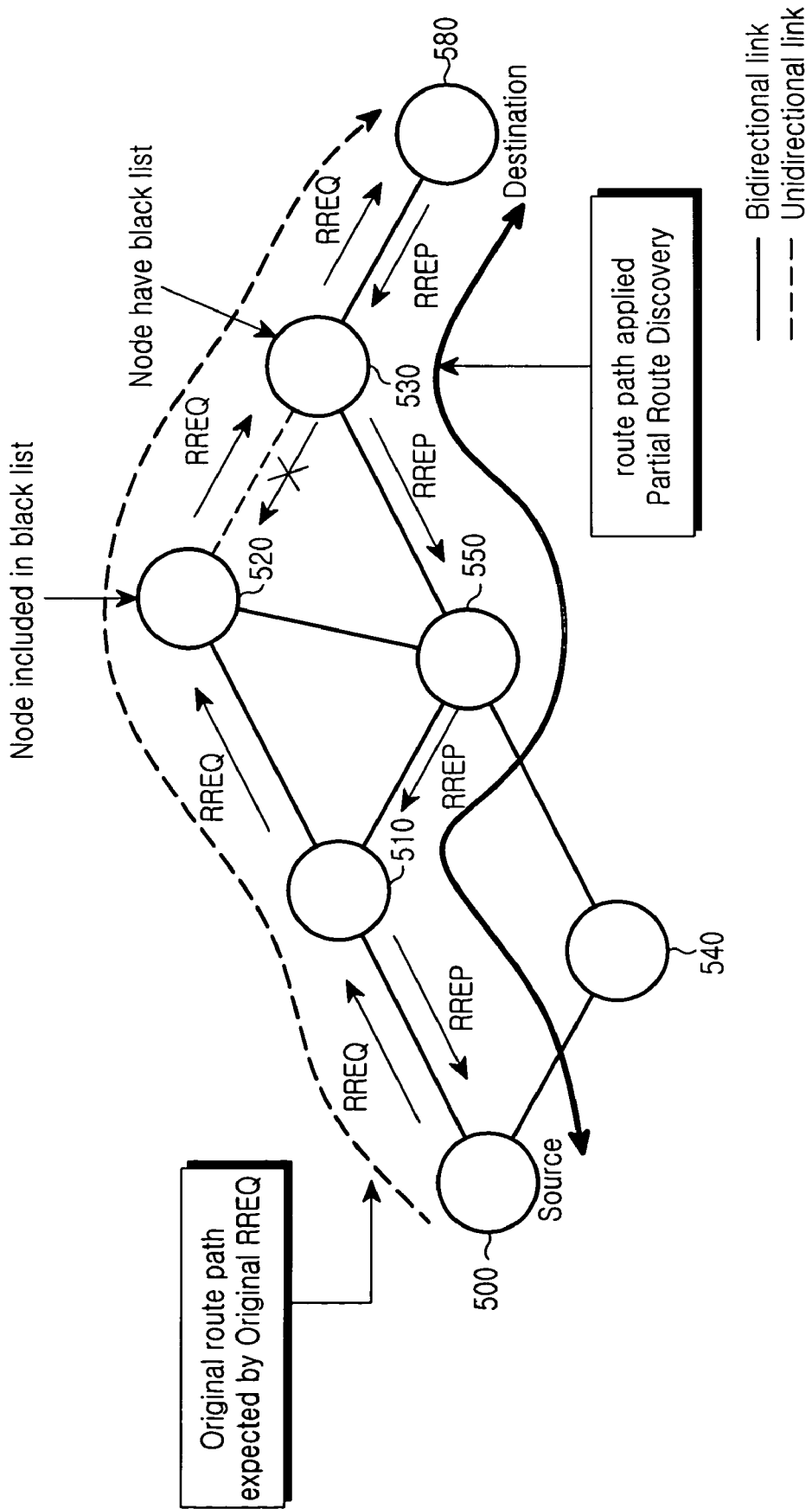
FIG. 8 is a diagram illustrating a complete route path formed between a source node and a destination node through partial route discovery according to an embodiment of the present invention.

FIG. 8 is a diagram illustrating a complete route path formed between a source node and a destination node through partial route discovery according to an embodiment of the present invention.

As illustrated, an original route path expected by an original RREQ will be formed between a source node 500 and a destination node 580 via intermediate nodes 510, 520 and 530. However, it is noted that a route path established by performing the partial route discovery procedure according to an embodiment of the present invention may be formed between the source node 500 and the destination node 580 via intermediate nodes 510, 550 and 530.

Meanwhile, a PRREQ message transmitted from the node 530 having failed to transmit the RREP due to the unidirectional link is stored in a partial RREQ buffer 225 of the partial route discovery block 200, and a PRREP message received in response to the PRREQ is stored in a partial RREP buffer 215.

When the node 530 having failed to transmit the RREP due to the unidirectional link receives the PRREQ, the partial RREQ section 220 transmits the received PRREQ to the original RREQ search section 230. The original RREQ search section 230 determines whether the RREQ stored in the RREQ buffer 420, transmitted from the source node 500, is identical to the RREQ transmitted to the node 530 having failed to transmit the RREP. If the transmitted RREQ is identical to the RREQ stored in the RREQ buffer 420, the original RREQ search section 230 transmits the PRREP to the node 530 that transmitted the PRREQ, via a partial reverse path formed based on the PRREQ.

However, if the transmitted RREQ is not identical to the RREQ stored in the RREQ buffer 420, the original RREQ search section 230 forwards the PRREQ to neighbor nodes. Finally, when the node 530 having failed to transmit the RREP receives the PRREP, the partial route path is completed.

The partial route path is formed using information on a minimum hop count and a nearest node having the same RREQ as that transmitted to the node 530 having failed to transmit the RREP.

Although the partial route path is established to the nearest node, link quality and output power of a corresponding node should also be taken into consideration on a trade-off basis. Although the partial route path is determined based on the nearest node and the minimum hop count in the embodiment of the present invention, the link quality can also be taken into account in determining the partial route path.

Figure 9:
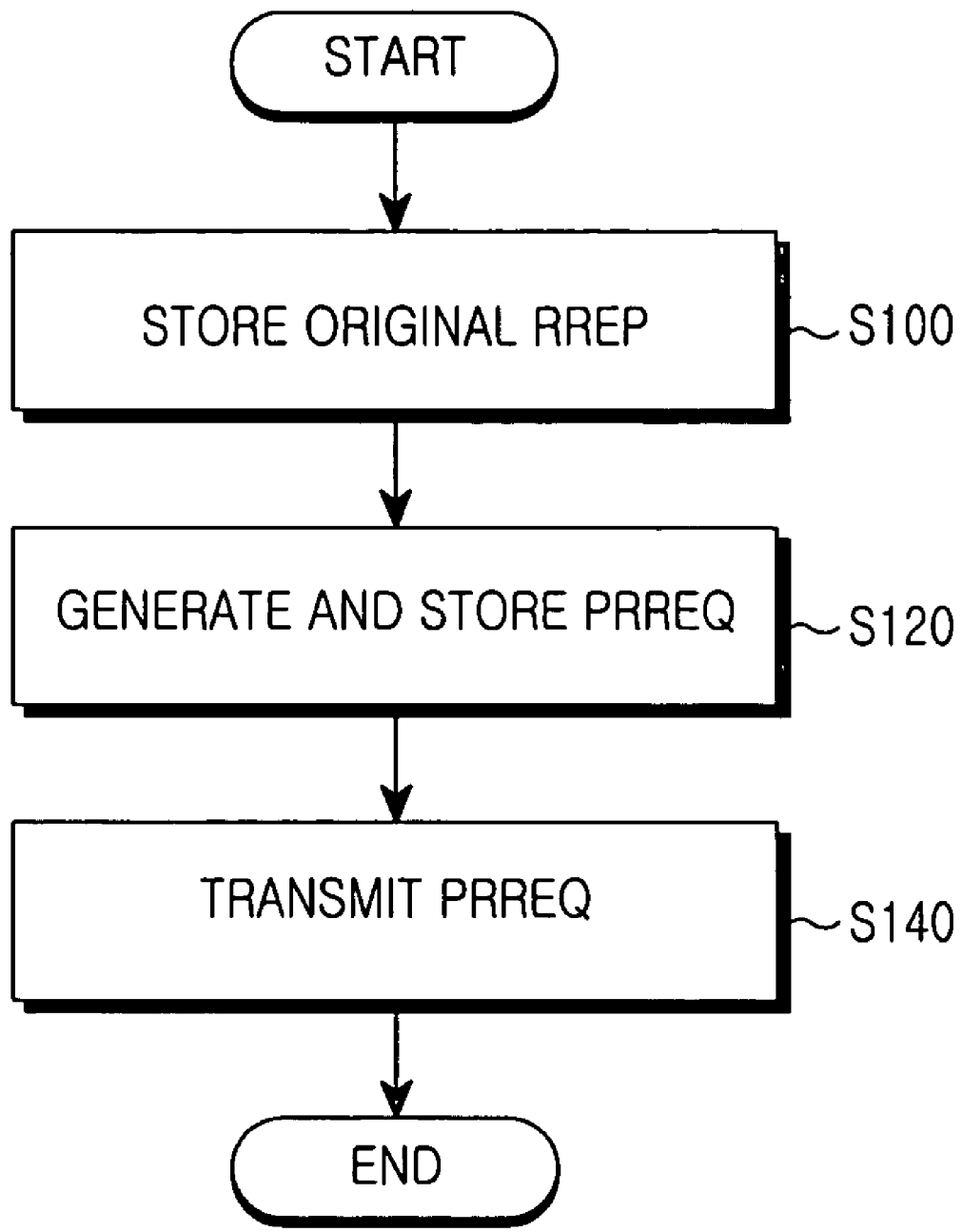
FIG. 9 is a flowchart illustrating a procedure for transmitting PRREQ by a node having failed to transmit RREP in order to set up a partial route path according to an embodiment of the present invention.

FIG. 9 is a flowchart illustrating a procedure for transmitting a PRREQ message by a node having failed to transmit a RREP message in order to set up a partial route path according to an embodiment of the present invention. Referring to FIG. 9, a node 530 having failed to transmit the RREP stores an original RREP received from a destination node 580 in the original RREP buffer 245 at Step S100. At this point, the node 530 having failed to transmit the RREP generates a PRREQ according to a PRREQ format and stores the generated PRREQ in the partial RREQ buffer 225 at Step S120. Then the node 530 having failed to transmit the RREP transmits the generated PRREQ to its neighbor nodes at Step S140.

Figure 10:
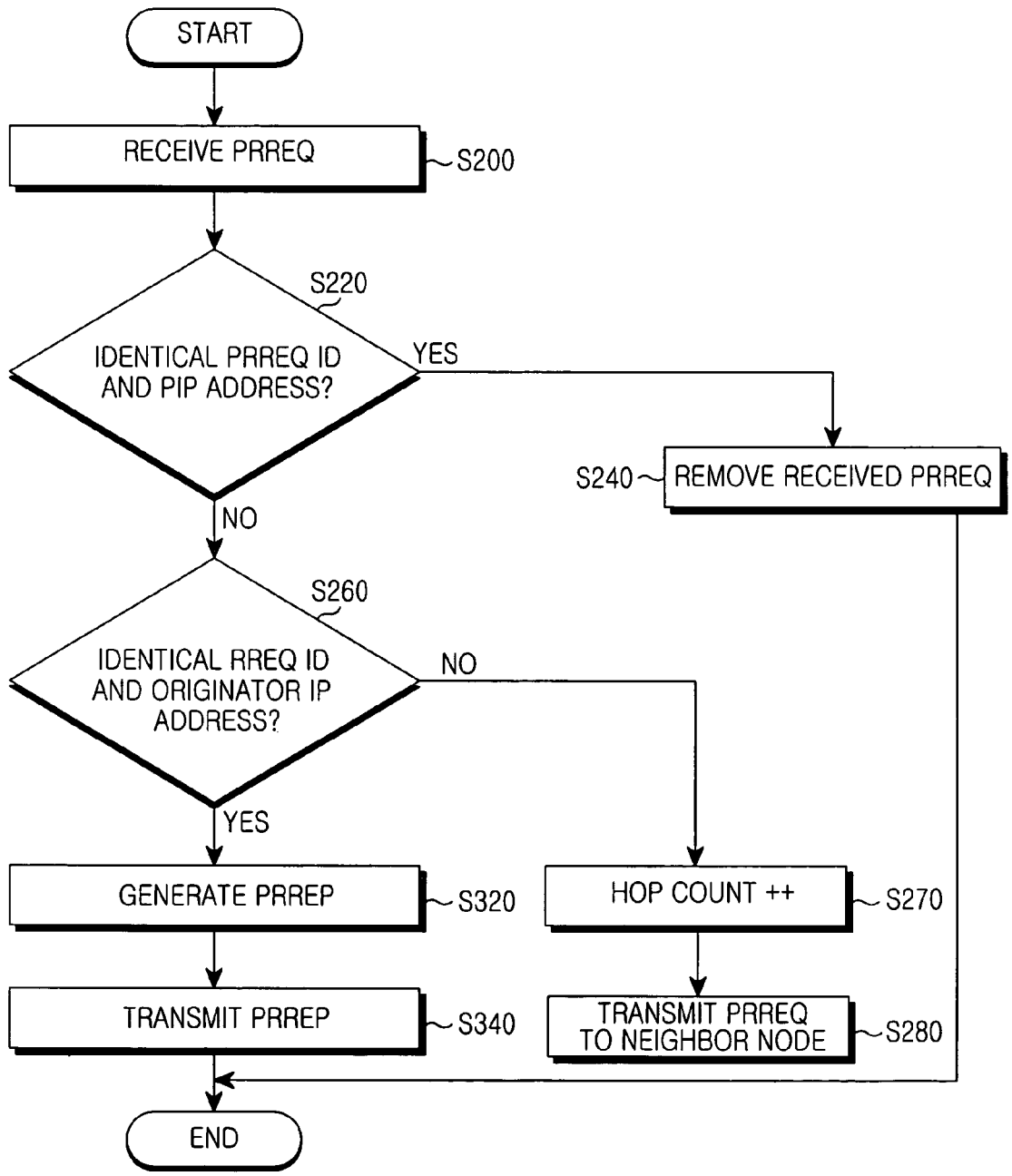
FIG. 10 is a flowchart illustrating a procedure for transmitting PRREP by intermediate nodes receiving PRREQ transmitted from a node having failed to transmit RREP according to an embodiment of the present invention.

FIG. 10 is a flowchart illustrating a procedure for transmitting a PRREP by intermediate nodes receiving a PRREQ transmitted from a node having failed to transmit a RREP according to an embodiment of the present invention.

Referring to FIG. 10, when a corresponding intermediate node receives a PRREQ at Step S200, it determines whether an identifier (ID) of the received PRREQ and a partial Internet protocol (PIP) address are identical to a PRREQ ID and PIP address stored in the partial RREQ buffer 225 at Step S220. If it is determined that the corresponding PRREQ IDs and PIP addresses are identical, the corresponding intermediate node removes the received PRREQ, determining that the corresponding intermediate node itself is the node 530 having failed to transmit the RREP at Step S240.

However, if it is determined in step S220 that the corresponding PRREQ IDs and PIP addresses are not identical, the corresponding intermediate node determines whether an ID of the RREQ and an original IP address included in the received PRREQ are identical to an RREQ ID and an original IP address stored in the RREQ buffer 420 at Step S260. If it is determined in step S260 that the corresponding RREQ IDs and original IP addresses are not identical, a corresponding intermediate node 550 increases a hop count at Step S270 and then transmits the received PRREQ to neighbor nodes at Step S280.

If it is determined in step S260 that the corresponding RREQ IDs and original IP addresses are identical, a corresponding intermediate node 510 generates a PRREP message according to a PRREP format in response to the received PRREQ at Step S320 and then transmits the generated PRREP to the node 530 that transmitted the PRREQ at Step S340.

In sum, if a node fails to transmit a RREP message, a unidirectional link is removed from a route path, and a partial route path is set up via only a route path for the necessary path through partial route discovery, completing an entire route path between a source node and a destination node. In this manner, it is possible to reduce a generation count of RREQ and RREP messages and a hop count in a network, contributing to rapid setup of a route path. In addition, it is also possible to reduce overhead occurring while a mobile ad hoc network is formed, thereby improving performance of the mobile ad hoc network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for setting up a route path between a source node and a destination node through route discovery in a mobile ad hoc network, comprising the steps of:
  (a) transmitting by the source node a route request message (RREQ) to the destination node;
  (b) receiving by the destination node the RREQ and transmitting an original route reply message (RREP) to the source node in response to the RREQ;
  (c) storing, by a first intermediate node having failed to transmit the original RREP received from the destination node, the original RREP, generating and storing a partial route request message (PRREQ) according to a predetermined PRREQ format, and transmitting the generated PRREQ to neighbor intermediate nodes;
  (d) generating, by a second intermediate node receiving the PRREQ, a partial route reply message (PRREP) corresponding to the PRREQ and transmitting the PRREP to the first intermediate node that transmitted the PRREQ, if an identifier (ID) of PRREQ and an original Internet protocol (IP) address included in the received PRREQ are identical to an ID and an original IP address of the RREQ received from the source node;
  (e) if a partial route path is set up between the first intermediate node and the second intermediate node as the first intermediate node receives the PRREP, transmitting by the first intermediate node the original RREP stored via a path established to the source node, via the partial route path; and
  (f) receiving by the source node the original RREP, and completing setup of the route path.

2. The method of claim 1, further comprising the step of increasing by the second intermediate node a hop count and transmitting the PRREQ to neighbor nodes, if it is determined that the ID of PRREQ and original IP address included in the received PRREQ are not identical to an ID and an original IP address of the RREQ received from the source node.

3. The method of claim 1, wherein the second intermediate node performs step (d) if the ID and the partial IP address of the received PRREQ are not identical to an ID and a partial IP address of the previously received PRREQ, and removes the received PRREQ if the ID and the partial IP address of the received PRREQ are identical to an ID and a partial IP address of the previously received PRREQ.

4. The method of claim 1, wherein failure of the first intermediate node to transmit the original RREP received from the destination node is due to an unidirectional link between nodes located between the source node and the destination node.

5. A node in a mobile ad hoc network for setting up a route path between a source node and a destination node through route discovery, comprising:
  a reception (RX) block for receiving signals transmitted from neighbor nodes;
  a transmission (TX) block for transmitting signals to the neighbor nodes;
  a route request (RREQ) block for processing a route request message (RREQ) received from a previous node and a RREQ to be transmitted to a next node;
  a route reply (RREP) block for processing a route reply message (RREP) received from the next node and a RREP to be transmitted to the previous node;

a route error (RERR) block for notifying the source node of route disconnection when a route to the destination node is disconnected;

a data block for processing actual transmission data;

a link failure block for detecting failure to transmit and receive a signal;

a partial route discovery block for performing partial route discovery for setting up a new route via other nodes excluding a node that received the RREQ; and a neighbor received signal strength indication (RSSI) block for calculating RSSI for a neighbor node located within a one-hop distance from the node itself and providing the calculated RSSI to the partial route discovery block;

wherein the partial route discovery block performs partial route discovery if transmission/reception failure information is received from the link failure block or the RSSI provided from the neighbor RSSI block is lower than an RSSI threshold.

6. The node of claim 5, wherein the partial route discovery block comprises:

a partial RREQ section for generating a partial route request message (PRREQ) to be transmitted to neighbor nodes;

a partial RREP section for receiving a partial route reply message (PRREP) transmitted from a corresponding node in response to the PRREQ;

an original RREQ search section for searching an original RREQ transmitted from the source node;

an original RREP store section for storing an original RREP transmitted from the destination node in response to the original RREQ; and an RREP retransmission section for transmitting the original RREP via a partial route path when the partial route path is set up by receiving the PRREP in response to the PRREQ transmitted to the neighbor nodes.

* * * * *